(12) United States Patent
Nakamura (10) Patent No.: US 7,569,968 B2
(45) Date of Patent: Aug. 4, 2009

(54) ROTOR FOR VEHICULAR ELECTRIC ROTARY MACHINE, VEHICULAR ELECTRIC ROTARY MACHINE USING SUCH ROTOR AND RELATED MANUFACTURING METHODS

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 33 days.

(21) Appl. No.: 11/797,189

(22) Filed: May 1, 2007

(65) Prior Publication Data
US 2008/0018191 A1 Jan. 24, 2008

(30) Foreign Application Priority Data
Jul. 21, 2006 (JP) .............................. 2006-199383

(51) Int. Cl.
*H02K 21/12* (2006.01)
(52) U.S. Cl. ................................. 310/263; 310/156.66
(58) Field of Classification Search ................................
310/156.66–156.73, 263
See application file for complete search history.

(56) References Cited
U.S. PATENT DOCUMENTS
5,973,435 A * 10/1999 Irie et al. ..................... 310/263

6,486,585 B1 11/2002 Badey et al.
6,548,935 B1 * 4/2003 Shendi et al. ................ 310/263
2002/0117934 A1 * 8/2002 Kanazawa et al. ........... 310/263
2002/0117935 A1 * 8/2002 Kanazawa et al. ........... 310/263

FOREIGN PATENT DOCUMENTS
JP   A 6-178474      6/1994
JP   A 10-313560    11/1998
JP   2004350414 A  * 12/2004

* cited by examiner

*Primary Examiner*—Tran N Nguyen
(74) *Attorney, Agent, or Firm*—Oliff & Berridge, PLC (57) ABSTRACT

A rotor for a vehicular electric rotary machine, a vehicular electric rotary machine using such a rotor, a method of manufacturing a rotor of a vehicular electric rotary machine and a method of manufacturing a vehicular electric rotary machine are disclosed. The rotor includes front and rear pole cores having disc portions, radially extending from boss portions supported with a rotary shaft and carrying thereon a field coil, which have claw-shaped poles which are circumferentially spaced from each other at equidistant intervals. The claw-shaped poles have flange portions circumferentially facing with each other for retaining permanent magnets and magnet holding members in circumferentially and equidistantly spaced positions. Each disc portion has a pair of stepped portions formed to be contiguous with the flange portions to restrict axial end faces of the permanent magnet and the magnet holding member in circumferential, radial and axial directions.

8 Claims, 4 Drawing Sheets

ROTOR FOR VEHICULAR ELECTRIC ROTARY MACHINE, VEHICULAR ELECTRIC ROTARY MACHINE USING SUCH ROTOR AND RELATED MANUFACTURING METHODS

CROSS REFERENCE TO RELATED APPLICATIONS

This application is related to Japanese Patent Application No. No. 2006-199383, filed on Jul. 21, 2006, the content of which is hereby incorporated by reference.

BACKGROUND OF THE INVENTION

1. Technical Field of the Invention

The present invention relates to rotors for vehicular electric rotary machines and vehicular electric rotary machines using such rotors and, more particularly, to a rotor for a vehicular electric rotary machine such as an on-vehicle alternator, a vehicular electric rotary machine employing such a rotor, a method of manufacturing a rotor of a vehicular electric rotary machine and a method of manufacturing a vehicular electric rotary machine.

2. Description of the Related Art

In the related art, it has been a usual practice for vehicles to be installed with vehicle alternators as vehicular electric rotary machines. With such vehicle alternators, a rotor normally comprises Lundell-type claw-shaped poles carried on a rotary shaft and supported inside a stator carried on a housing. In order to allow magnetic fluxes to reliably exchange between the Lundell-type poles and the stator, permanent magnets have been provided each between sidewalls of the claw-shaped poles for preventing the magnetic fluxes from leaking between the claw-shaped poles. Further, another attempt has heretofore been made to prevent the permanent magnets from being thrown out of the rotor in a radially outward direction thereof to result in damages due to centrifugal forces acting on the permanent magnets.

As one of these technologies, a vehicle alternator has been proposed which includes a rotor having Lundell-type poles whose outer peripheries are provided with axially extending flange portions between which each permanent magnet is held in fixed place with magnet holding members being interconnected to each other with the use of a connecting member formed in a toric shape (see Patent Publication 1: Japanese Patent Unexamined Application Publication No. 10-313560 on pages 3 and 4 and in FIGS. 1 to 9).

U.S. Pat. No. 6,486,585 (Patent Publication 2) discloses a vehicle alternator including a rotor having Lundell-type poles. With such a vehicle alternator, after the rotor has been assembled, the rotor is subjected to a cutting step for forming flange portions on claw-shaped poles with grooves to allow permanent magnets to be inserted therein.

Meanwhile, it has been a common practice for the rotor to be cut on a final stage to take a rotational balance. When this takes place, the cutting causes the formation of iron chips and iron powder that tend to stick to the grooves of the rotor. These iron chips and iron powder are detached from the outer periphery of the rotor during rotation thereof with the resultant tendency of causing various issues such as defective rotation of the rotor. In addition, the iron chips and iron powder tend to jump out of the rotor into the wirings of the stator thereby causing damage to occur thereon with the resultant deterioration in insulation properties. Moreover, in the middle of a stage in which the permanent magnets are kept as stocks in a factory until their assemblies are completed as a rotor or in a way of delivery of non-assembled component parts, minute iron powder in the factory tends to stick to the rotor and enters the stator, thereby causing the same issues as those mentioned above. In order to address such issues, an attempt has heretofore been undertaken to provide technology with which non-magnetized magnets are preassembled to a rotor after which compensating cutting step is carried out to take a rotational balance of the rotor and, subsequently, the magnets are magnetized (see Patent Publication 3: Japanese Patent Unexamined Application Publication No. 6-178474 on pages 3 to 6 and in FIGS. 1 to 13).

Although no disclosure is made in Patent Publication 1 on a time point at which the magnets are magnetized, the magnets may be possibly magnetized during the production of a rotor on a final stage thereof as disclosed in Patent Publication 3. With the rotor disclosed in Patent Publication 1, however, a need arises for the magnet holding members and the member for interconnecting these magnet holding members to be formed in a toric configuration. This results in increases in the number of component parts and man-hours, causing an issue to arise with an increase in production cost besides the cost of permanent magnet bodies.

With the vehicular electric rotary machine disclosed in Patent Publication 2, further, although the permanent magnets can be assembled to the rotor on a final stage, iron materials or iron powder, resulting from cutting to form the flange portions of the claw-shaped poles and the portions for the permanent magnets to be inserted, cause the field coil, wound inside the claw-shaped poles, to be damaged and remain in areas between the claw-shaped poles and the outermost circumferential periphery of the field coil. This causes another issue to arise with deficiencies occurring during the power generating operation of the vehicle alternator.

With the vehicular electric rotary machine disclosed in Patent Publication 3, furthermore, each of the permanent magnets extends not only to an area between the adjacent claw-shaped poles but also to another area facing the claw-shaped pole in an entire axial length thereof, thereby forming a toric configuration as a whole. With such a configuration, the permanent magnets of the rotor are made from synthetic resin mixed with magnetic powder. Such a structure results in a shortage of magnetic force for a leakage of magnetic fluxes to be prevented in a modern high power-output vehicle alternator. Another consequence is the rotor having a lack of strength for high-speed rotation of the rotor. Thus, it becomes hard to employ such an alternator as a vehicle alternator. In addition, since the permanent magnets surround the rotor in an entire circumference thereof throughout the axial length thereof, the amount of metallic raw material used for the magnet holding members also increases. Therefore, an issue arises with the vehicle alternator disclosed in Patent Publication 3 in that the production cost of the magnet holding members increases.

SUMMARY OF THE INVENTION

The present invention has been completed with a view to addressing the above issues and has an object to provide a rotor for a vehicle alternator enabling a reduction in production cost with an increase in reliability, a vehicle alternator employing such a rotor, a method of manufacturing a rotor for a vehicle alternator and a method of manufacturing a vehicle alternator.

To achieve the above object, a first aspect of the present invention provides a rotor for a vehicular electric rotary machine, comprising a rotary shaft, and front and rear pole cores with cylindrical boss portions carried on the rotary shaft adjacent to each other, front and rear disc portions radially extending from axial ends of the boss portions, respectively, a field coil carried by the boss portions, and front and rear claw-shaped pole portions axially extending from outer peripheries of the front and rear disc portions in axially opposite directions so as to mate with each other, a plurality of permanent magnets each disposed between circumferentially adjacent claw-shaped poles, and a plurality of magnet holding members, each made of metallic material, each of which covers an outer top surface of each permanent magnet and circumferential sidewalls of each of the permanent magnets, respectively. Each of the front and rear disc portions includes axially extending stepped portions to retain axial end faces of each permanent magnet and each magnet holding member in axially and radially fixed relationship.

With such a structure of the rotor, the disc portions are provided with the stepped portions for the axial end faces of each permanent magnet and each magnet holding member to be placed. With the permanent magnet and the magnet holding member placed in the stepped portions formed on the disc portions, the permanent magnet and the magnet holding member can be restricted in a circumferential direction, a radial direction and an axial direction of the rotor. Thus, no need arises for preparing a discrete member for the permanent magnets and the magnet holding members to be connected in a toric configuration for restriction. This enables the prevention of increases in the number of component parts and man-hours, while enabling a magnet holding member with a simplified structure to be employed. This makes it possible to achieve a reduction in production cost of the rotor.

With the rotor for the vehicular electric rotary machine of the present embodiment, the permanent magnets may be non-magnetized on a stage when the rotor is assembled and magnetized on another stage when the rotor is assembled to the vehicular electric rotary machine.

The rotor is initially assembled and an outer diametric area of the rotor is cut while performing the cutting operation to take a rotational balance of the rotor, after which the preassembled permanent magnets are magnetized. With the rotor fabricated in such a sequence, the various issues encountered in the related art vehicle alternators can be addressed solving the problem of a drop in reliability resulting from the rotor to which the pre-magnetized permanent magnets are assembled.

With the rotor for the vehicular electric rotary machine of the present embodiment, the stepped portions may be formed on each of the disc portions to be contiguous with both circumferential sidewalls and the flange portions of each of the claw-shaped poles.

With the stepped portions formed on each disc portion in continuing relationship with both the circumferential sidewalls of the claw-shaped poles and the flange portions, the pole core having the stepped portions can be formed by forging. This makes it possible to form the stepped portions on the pole core in a simple step of forging without taking discrete cutting operations, enabling the suppression of an increase in production cost.

A second aspect of the present invention provides a vehicular electric rotary machine, comprising a housing carrying thereon a stator, a rotary shaft rotatably supported with the housing, a rotor including front and rear pole cores, carried on the rotary shaft adjacent to each other to be rotatable inside the stator, which include boss portions supported on the rotary shaft and carrying thereon a field coil, front and rear disc portions radially extending from the boss portions, respectively, front claw-shaped pole portions axially extending from the front boss portion so as to surround the field coil in equidistantly spaced positions and each having a pair of circumferentially and axially extending flange portions, and rear claw-shaped pole portions, each having a pair of circumferentially and axially extending flange portions, which axially extend from the second boss portion so as to surround the field coil in equidistantly spaced positions circumferentially spaced from the front claw-shaped pole portions, respectively, to provide a plurality of circumferentially spaced clearances each between each of the front claw-shaped pole portions and each of the rear claw-shaped pole portions, a plurality of permanent magnets each disposed in the plurality of circumferentially spaced clearances, respectively, and a plurality of magnet holding members covering the plurality of permanent magnets, respectively. Each of the front and rear disc portions includes axially extending stepped portions to retain axial end faces of each of the permanent magnets and each of the magnet holding members in axially and radially fixed positions.

With such a structure of the vehicular electric rotary machine, the stepped portions are formed on the disc portions of the rotor for the axial end faces of each permanent magnet and each magnet holding member to be fixedly placed. With the permanent magnet and the magnet holding member resting on the stepped portions of the disc portions, the permanent magnet and the magnet holding member can be restricted in a circumferential direction, a radial direction and an axial direction of the rotor. Accordingly, no discrete restricting member needs to be provided for connecting the permanent magnets and the magnet holding members in a toric configuration. This prevents increases in the number of component parts and man-hours and enables a magnet holding member with a simplified structure to be employed. This results in a capability of achieving a reduction in production cost of the vehicle alternator.

With the vehicular electric rotary machine of the present embodiment, the permanent magnets may be non-magnetized on a stage when the rotor is assembled and magnetized on another stage when the rotor is assembled to the vehicular electric rotary machine.

The rotor is assembled first and an outer diametric area of the rotor is subjected to the cutting while a rotational balance of the rotor is taken by the cutting operation. Thereafter, the preassembled permanent magnets are magnetized. With the vehicular electric rotary machine having such a rotor, the vehicular electric rotary machine can prevent a drop in reliability resulting from the rotor to which the pre-magnetized permanent magnets are assembled.

With the vehicular electric rotary machine of the present embodiment, the stepped portions may be formed on each of the disc portions to be contiguous with both circumferential sidewalls and the flange portions of each of the claw-shaped poles.

With each disc portion having the stepped portions in continuing relationship with both the circumferential sidewalls of the claw-shaped poles and the flange portions, the pole core can be formed with the stepped portions by forging. Thus, the stepped portions can be formed on the pole core by forging. Thus, no need arises for executing discrete cutting operations, enabling the suppression of an increase in production cost.

A third aspect of the present invention provides a vehicular electric rotary machine, comprising a housing carrying thereon a stator, a rotary shaft rotatably supported with the housing, a rotor including front and rear pole cores, carried on the rotary shaft adjacent to each other to be rotatable inside the stator, which include boss portions supported on the rotary shaft and carrying thereon a field coil, front and rear disc portions radially extending from the boss portions, respectively, front claw-shaped pole portions axially extending from one axial end of the front boss portion so as to surround the field coil in equidistantly spaced positions and each having a pair of circumferentially and axially extending flange portions, and rear claw-shaped pole portions, each having a pair of circumferentially and axially extending flange portions, which axially extend from one axial end of the second boss portion so as to surround the field coil in equidistantly spaced positions circumferentially spaced from the front claw-shaped pole portions, respectively, to provide a plurality of circumferentially spaced clearances each between each of the front claw-shaped pole portions and each of the rear claw-shaped pole portions, the front and rear disc portions having pluralities of axially facing stepped portions to be contiguous with the flange portions, respectively, a plurality of permanent magnets each disposed in the plurality of circumferentially spaced clearances, respectively, and a plurality of magnet holding members covering the plurality of permanent magnets, respectively. Each of the permanent magnets and each of the magnet holding members are held in abutting engagement with the stepped portions of each of the front and rear disc portions to be restricted in axially and radially fixed positions.

With the vehicular electric rotary machine of the present embodiment, the permanent magnets may be non-magnetized on a stage when the rotor is assembled and magnetized on another stage when the rotor is assembled to the vehicular electric rotary machine.

Upon assembling the rotor after which an outer diametric area of the rotor is cut, a rotational balance of the rotor is taken by cutting in another step. Subsequently, the preassembled permanent magnets are magnetized. With the vehicular electric rotary machine having such a rotor, the issue arising from the rotor to which the pre-magnetized permanent magnets are assembled can be addressed, thereby enabling the vehicular electric rotary machine to have increased reliability.

A fourth aspect of the present invention provides a method of manufacturing a rotor of a vehicular electric rotary machine, comprising the steps of preparing a first pole core having a cylindrical boss portion carried on a rotary shaft, a disc portion radially extending from an axial end of the cylindrical boss portion, a field coil carried by the cylindrical boss portion, and a plurality of equidistantly spaced claw-shaped pole portions axially extending from an outer periphery of the disc portion, preparing a second pole core having a cylindrical boss portion, a disc portion radially extending from an axial end of the cylindrical boss portion of the second pole core, and a plurality of equidistantly spaced claw-shaped pole portions axially extending from an outer periphery of the disc portion of the second pole core, preparing a circumferentially extending connecting member having a plurality of circumferentially spaced magnet holding elements, and carrying a plurality of permanent magnets and a plurality of magnet holding members covering the permanent magnets, respectively, with the magnet holding elements of the connecting member such that each of the permanent magnets and each of the magnet holding members face a circumferential sidewall of each of the claw-shaped poles. The permanent magnets and the magnet holding members are preassembled to the claw-shaped poles of the first pole core such that one pair of the permanent magnets are held on the sidewalls of each claw-shaped pole of the first pole core to provide a circumferentially spaced clearances each between adjacent pairs of the permanent magnets. The second pole core is assembled to the preassembled first pole core so as to allow the claw-shaped poles of the second pole core match the circumferentially spaced clearances, respectively, such that each of the permanent magnets and each of the magnet holding member are sandwiched between each of the claw-shaped poles of the first pole core and each of the claw-shaped poles of the second pole core for thereby forming the rotor. Then, the connecting member is removed from the rotor.

With such a rotor manufacturing method, since the connecting member for connecting the pluralities of permanent magnets and magnet holding members is used only during the assembling of the rotor, no connecting member is left on the rotor and can be reused on a next step of assembling another rotor. This achieves a reduction in material costs and provides a capability of assembling the permanent magnets and the magnet holding members to the claw-shaped poles in a simple process. Thus, the method of the present invention enables a rotor of a vehicle alternator to be fabricated at lower cost than that of the related art rotor having permanent magnets each placed between adjacent polar claws.

With the method of manufacturing the rotor for the vehicular electric rotary machine, each of the disc portions of the first and second pole cores may include axially extending stepped portions to retain axial end faces of each permanent magnet and each magnet holding member in axially and radially fixed relationship.

With the provision of the stepped portion formed on each disc portion of the rotor, each permanent magnet and each magnet holding member can be fixedly retained on the rotor without the use of discrete holder elements. This results in a reduction in production cost, while providing a rotor with increased reliability.

With the method of manufacturing the rotor of the vehicular electric rotary machine, the permanent magnets may be non-magnetized on a stage when the rotor is assembled and magnetized on another stage when the rotor is assembled to the vehicular electric rotary machine.

With such a manufacturing method, the rotor can be assembled in a first stage and an outer diametric area of the rotor is subsequently cut upon which the cutting operation is performed to take a rotational balance of the rotor. Thereafter, the preassembled permanent magnets are magnetized. With the rotor fabricated in such a sequence, the various issues encountered in the related art vehicle alternators can be addressed solving the problem of a drop in reliability resulting from the rotor to which the pre-magnetized permanent magnets are assembled.

With the method of manufacturing the rotor of the vehicular electric rotary machine, the connecting member may have both ends formed with first and second engaging ends that are engageable with each other to be formed in a toric structure.

With the connecting member having first and second connecting ends, the connecting member can be easily formed in a toric configuration upon engaging the first and second engaging ends with each other. This enables the connecting member to be readily removed from the assembled rotor upon completely setting the permanent magnets and the magnet holding members to the rotor. This achieves a reduction in man-hours for assembling the rotor, enabling the rotor to be produced at low cost.

A fifth aspect of the present invention provides a method of manufacturing a rotor of a vehicular electric rotary machine, comprising the steps of preparing a first pole core having a cylindrical boss portion carried on a rotary shaft, a disc portion radially extending from an axial end of the cylindrical boss portion, a field coil carried by the cylindrical boss portion, a plurality of equidistantly spaced claw-shaped pole portions axially extending from an outer periphery of the disc portion and having circumferentially extending flange portions, respectively, and a plurality of stepped portions formed on the disc portion to be contiguous with the flange portions, respectively, preparing a second pole core having a cylindrical boss portion, a disc portion radially extending from an axial end of the cylindrical boss portion of the second pole core, and a plurality of equidistantly spaced claw-shaped pole portions axially extending from an outer periphery of the disc portion of the second pole core and having circumferentially extending flange portions, respectively, and a plurality of stepped portions formed on the disc portion of the second pole core to be 5 contiguous with the flange portions of the claw-shaped pole portions of the second pole core, respectively, preparing a circumferentially extending connecting member having a plurality of circumferentially spaced magnet holding elements, carrying a plurality of permanent magnets and a plurality of magnet holding members covering the permanent magnets, respectively, with the magnet holding elements of the connecting member such that each of the permanent magnets and each of the magnet holding members face a circumferential sidewall of each of the claw-shaped poles, and preassembling the permanent magnets and the magnet holding members to the claw-shaped poles of the first pole core so as to allow one axial end faces of each permanent magnet and each magnet holding member to be brought into engagement with the stepped portions of the disc portion of the first pole core such that one pair of the permanent magnets are held on the sidewalls of each claw-shaped pole of the first pole core to provide a circumferentially spaced clearances each between adjacent pairs of the permanent magnets. The second pole core is assembled to the preassembled first pole core so as to allow the other axial end faces of each permanent magnet and each magnet holding member to be brought into engagement with the stepped portions of the disc portion of the second pole core such that each of the permanent magnets and each of the magnet holding member are sandwiched between each of the claw-shaped poles of the first pole core and each of the claw-shaped poles of the second pole core for thereby forming the rotor. Then, the connecting member is removed from the rotor.

With such a rotor manufacturing method, since the pluralities of permanent magnets and magnet holding members are preliminarily carried with the magnet holding elements of the connecting member. Then, the pluralities of permanent magnets and magnet holding members can be assembled to the rotor each between the adjacent polar claws, upon which the connecting member can be easily removed from the rotor. Thus, since the connecting member can be used only during the assembling of the rotor, no connecting member is left on the rotor and can be reused on a next stage of assembling another rotor. This achieves a reduction in material costs and provides a capability of assembling the permanent magnets and the magnet holding members to the claw-shaped poles in an efficient way. Thus, the method of the present invention enables a rotor of a vehicle alternator to be fabricated at lower cost than that of the related art rotor having permanent magnets each placed between adjacent polar claws.

With the method of manufacturing the rotor of the vehicular electric rotary machine, the permanent magnets may be non-magnetized on a stage when the rotor is assembled and magnetized on another stage when the rotor is assembled to the vehicular electric rotary machine.

With such a manufacturing method, the rotor can be firstly assembled with an outer diametric area of the rotor being subsequently cut. Thereafter, the cutting operation is performed to take a rotational balance of the rotor. Subsequently, the preassembled permanent magnets are magnetized. With the rotor fabricated in such a sequence, the various issues encountered in the related art vehicle alternators can be addressed solving the problem of a drop in reliability resulting from the rotor to which the pre-magnetized permanent magnets are assembled.

With the method of manufacturing the rotor of the vehicular electric rotary machine, the connecting member may have both ends formed with first and second engaging ends that are engageable with each other to be formed in a toric structure.

With the connecting member formed with the first and second connecting ends, the connecting member can be easily connected at both ends to form a toric configuration. Thus, the connecting member can be readily removed from the assembled rotor upon completely setting the permanent magnets and the magnet holding members to the rotor. This allows the connecting member to be reused on a subsequent assembling stage of another rotor, while achieving a reduction in man-hours for assembling the rotor with a resultant low production cost.

A fifth aspect of the present invention provides a method of manufacturing a vehicular electric rotary machine, comprising the steps of preparing a housing carrying thereon a stator, preparing a first pole core having a cylindrical boss portion carried on a rotary shaft, a disc portion radially extending from an axial end of the cylindrical boss portion, a field coil carried by the cylindrical boss portion, and a plurality of equidistantly spaced claw-shaped pole portions axially extending from an outer periphery of the disc portion, preparing a second pole core having a cylindrical boss portion, a disc portion radially extending from an axial end of the cylindrical boss portion of the second pole core, and a plurality of equidistantly spaced claw-shaped pole portions axially extending from an outer periphery of the disc portion of the second pole core, preparing a circumferentially extending connecting member having a plurality of circumferentially spaced magnet holding elements, and carrying a plurality of permanent magnets and a plurality of magnet holding members covering the permanent magnets, respectively, with the magnet holding elements of the connecting member such that each of the permanent magnets and each of the magnet holding members face a circumferential sidewall of each of the claw-shaped poles. The permanent magnets and the magnet holding members are preassembled to the claw-shaped poles of the first pole core such that one pair of the permanent magnets are held on the sidewalls of each claw-shaped pole of the first pole core to provide a circumferentially spaced clearances each between adjacent pairs of the permanent magnets. The second pole core is assembled to the preassembled first pole core so as to allow the claw-shaped poles of the second pole core match the circumferentially spaced clearances, respectively, such that each of the permanent magnets and each of the magnet holding members are sandwiched between each of the claw-shaped poles of the first pole core and each of the claw-shaped poles of the second pole core for thereby forming a rotor. Then, the connecting member is removed from the rotor, and the rotor is assembled to the housing such that the rotor is supported with the housing to be rotatable inside the stator With such a method of manufacturing the vehicular electric rotary machine, the rotor can be assembled in an efficient manner with a capability of using a minimum number of component parts. This allows the vehicular electric rotary machine to have increased reliability with a reduction in production cost.

With the method of manufacturing the vehicular electric rotary machine, each of the disc portions of the first and second pole cores may include axially extending stepped portions to retain axial end faces of each permanent magnet and each magnet holding member in axially and radially fixed relationship.

The use of the disc portions formed with the axially extending stepped portions enables the permanent magnets and the magnet holding members to be restricted on the rotor in the circumferential direction, the radial direction and the axial direction. Thus, no separate retaining member is needed for retaining the permanent magnets and the magnet holding members in fixed places. This results in a reduction in the number of component parts and man-hours, enabling the vehicle alternator to be manufactured at low cost.

With the method of manufacturing the vehicular electric rotary machine, the permanent magnets may be non-magnetized on a stage when the rotor is assembled and magnetized on another stage when the rotor is assembled to the vehicular electric rotary machine.

With such a manufacturing method, the rotor can be firstly assembled and an outer diametric area of the rotor is subsequently cut. Thereafter, the cutting operation is performed to take a rotational balance of the rotor, after which the preassembled permanent magnets are magnetized. With such a sequence of assembling steps, the various issues encountered in the related art vehicle alternators can be addressed solving the problem of a drop in reliability resulting from the rotor to which the pre-magnetized permanent magnets are assembled.

With the method of manufacturing the vehicular electric rotary machine, the connecting member may have both ends formed with first and second engaging ends that are engageable with each other to be formed in a toric structure.

With the provision of such a connecting member, the connecting member can be easily connected at both ends to form a toric configuration while carrying the permanent magnets and the magnet holding members at given proper orientations in alignment with the polar claws of the first pole core. Thus, the both ends of the connecting member can be readily uncoupled from each other and the connecting member can be easily removed from the assembled rotor upon completely setting the permanent magnets and the magnet holding members to the rotor. This allows the connecting member to be reused on a subsequent assembling stage of another rotor, while achieving a reduction in man-hours for assembling the rotor with the resultant low production cost.

A sixth aspect of the present invention provides a method of manufacturing a vehicular electric rotary machine, comprising the steps of preparing a housing carrying thereon a stator, preparing a first pole core having a cylindrical boss portion carried on a rotary shaft, a disc portion radially extending from an axial end of the cylindrical boss portion, a field coil carried by the cylindrical boss portion, a plurality of equidistantly spaced claw-shaped pole portions axially extending from an outer periphery of the disc portion and having circumferentially extending flange portions, respectively, and a plurality of stepped portions formed on the disc portion to be contiguous with the flange portions, respectively, and preparing a second pole core having a cylindrical boss portion, a disc portion radially extending from an axial end of the cylindrical boss portion of the second pole core, and a plurality of equidistantly spaced claw-shaped pole portions axially extending from an outer periphery of the disc portion of the second pole core and having circumferentially extending flange portions, respectively, and a plurality of stepped portions formed on the disc portion of the second pole core to be contiguous with the flange portions of the claw-shaped pole portions of the second pole core, respectively. A circumferentially extending connecting member having a plurality of circumferentially spaced magnet holding elements and prepared, and a plurality of permanent magnets and a plurality of magnet holding members covering the permanent magnets, respectively, are carried with the magnet holding elements of the connecting member such that each of the permanent magnets and each of the magnet holding members face a circumferential sidewall of each of the claw-shaped poles. The permanent magnets and the magnet holding members are assembled to the claw-shaped poles of the first pole core so as to allow one axial end faces of each permanent magnet and each magnet holding member to be brought into engagement with the stepped portions of the disc portion of the first pole core such that one pair of the permanent magnets are held on the sidewalls of each claw-shaped pole of the first pole core to provide a circumferentially spaced clearances each between adjacent pairs of the permanent magnets. The second pole core is assembled to the preassembled first pole core so as to allow the other axial end faces of each permanent magnet and each magnet holding member to be brought into engagement with the stepped portions of the disc portion of the second pole core such that each of the permanent magnets and each of the magnet holding member are sandwiched between each of the claw-shaped poles of the first pole core and each of the claw-shaped poles of the second pole core for thereby forming a rotor. The connecting member is removed from the rotor, and the rotor is assembled to the housing such that the rotor is supported with the housing to be rotatable inside the stator.

With such a method of manufacturing the vehicular electric rotary machine, the use of the circumferentially extending connecting member having the plurality of circumferentially spaced magnet holding elements allows the permanent magnets and the magnet holding members to be preassembled to the polar claws of the first pole core. This enables the rotor to be assembled in an efficient manner with the use of a minimum number of component parts. Thus, the vehicular electric rotary machine can be manufactured at low cost while achieving increased reliability.

With the method of manufacturing the vehicular electric rotary machine, the permanent magnets may be non-magnetized on a stage when the rotor is assembled and magnetized on another stage when the rotor is assembled to the vehicular electric rotary machine.

With such a manufacturing method, the rotor can be assembled on a first stage and, then, an outer diametric portion of the rotor is subsequently cut. Thereafter, the rotor is subjected to further cutting operation to take a rotational balance of the rotor, after which the preassembled permanent magnets are magnetized. With such a sequence of assembling steps, the various issues encountered in the related art vehicle alternators can be addressed solving the problem of a drop in reliability resulting from the rotor to which the pre-magnetized permanent magnets are assembled.

With the method of manufacturing the vehicular electric rotary machine, the connecting member may have both ends formed with first and second engaging ends that are engageable with each other to be formed in a toric structure.

With the use of such a connecting member, the connecting member can be easily connected at both ends to form a toric configuration with the magnetic holding element carrying the permanent magnets and the magnet holding members at given proper orientations in alignment with the polar claws of the first pole core. Thus, the permanent magnets and the magnet holding members can be easily set to the polar claws of the first pole core in an efficient manner and, subsequently, the connecting member is removed from the assembled rotor. This allows the connecting member to be reused on a subsequent assembling stage of another rotor, while achieving a reduction in man-hours for assembling the rotor with the resultant low production cost.

DETAILED DESCRIPTION OF PREFERRED EMBODIMENTS

Now, a rotor of a vehicular electric rotary machine, a vehicular electric rotary machine employing such a rotor, a method of manufacturing a rotor of a vehicular electric rotary machine and a method of manufacturing a vehicular electric rotary machine will be described below in detail with reference to a vehicle alternator of an embodiment according to the present invention illustrated in the accompanying drawings. However, the present invention is construed not to be limited to such a vehicle alternator of an illustrated embodiment described below and technical concepts of the present invention may be implemented in combination with other known technologies or other technologies having required functions equivalent to such known technologies.

The vehicular electric rotary machine of one embodiment of the present embodiment will be described below with reference to a vehicle alternator shown in FIGS. 1, 2A and 2B. With the present embodiment, the vehicle alternator will be described as the vehicle electric rotary machine that is rotatably driven with an internal combustion engine (not shown) for generating electric power for supply to an on-vehicle power supply (not shown).

Figure 1:
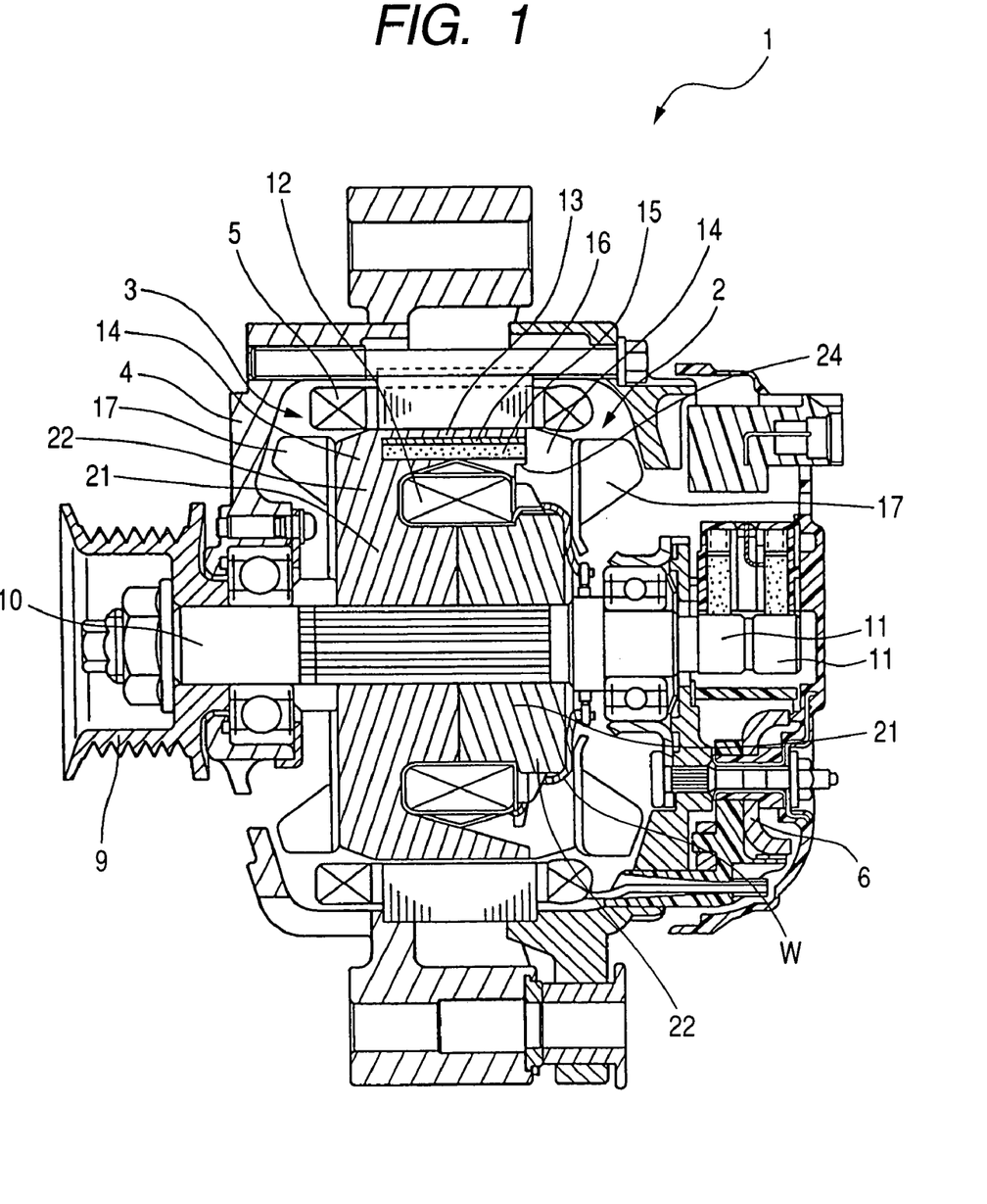
FIG. 1 is a cross sectional view showing an overall structure of a vehicle alternator of one embodiment according to the present invention.

FIG. 1 is a cross sectional view showing an overall structure of the vehicle alternator of one embodiment according to the present invention.

As shown in FIG. 1, the vehicle alternator I comprises a rotor 2 functioning as a magnetic field pole, a stator 3 having an armature coil 5 functioning as an armature, a housing 4 carrying therein the stator 3 in which the rotor 2 is rotatably supported, and a rectifier 6 operative to convert AC power, induced in the armature coil 5 of the stator 3, into DC power.

The rotor 2 includes a rotary shaft 10 whose front end carries thereon a pulley 9 which is drivably coupled to the internal combustion engine via a belt (not shown) to be rotatably driven, a field coil 12 electrically connected through lead wires W to slip rings 11, 11 mounted on the rotary shaft 10 on a rear end thereof to be supplied with field current, front and rear pole cores 14 carried on the rotary shaft 10 and having outer circumferential peripheries formed with pluralities of claw-shaped poles 13 circumferentially placed in equidistant intervals so as to mesh with each other for exchanging magnetic fluxes excited by field current, a plurality of permanent magnets 15 each interposed between a pair of adjacent claw-shaped poles 13 of the front and rear pole cores 14 and magnetized in an orientation to decrease a leakage of magnetic fluxes, magnet holding members 16 for holding the permanent magnets 15 each in an area between the pair of adjacent claw-shaped poles 13 so as to protect each of the permanent magnets 15, and cooling fans 17 mounted on front and rear end faces of the front and rear pole cores 14, respectively.

The front and rear pole cores 14 include front and rear cylindrical boss portions 21 press fitted to and carried with the rotary shaft 10, and front and rear disc portions 22 radially extending outward from front and rear axial ends of the boss portions 21, respectively. The pluralities of claw-shaped poles 13 axially extending from outer circumferential peripheries of the front and rear disc portions 22, respectively, so as to mate with each other in a circumferentially spaced relationship.

Figure 2A:
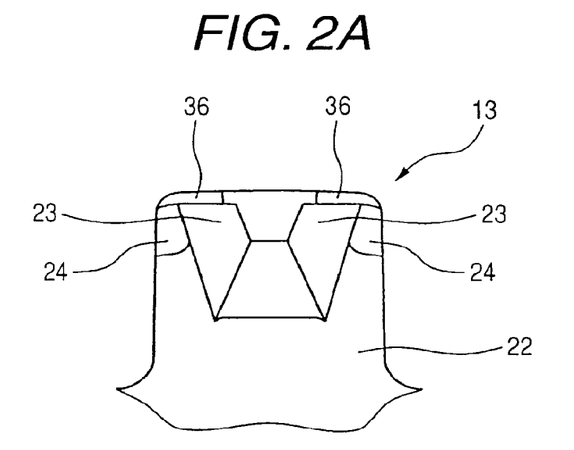
FIG. 2A is a fragmentary view showing a part of a claw-shaped pole of a pole core forming a rotor shown in FIG. 1.
Figure 2B:
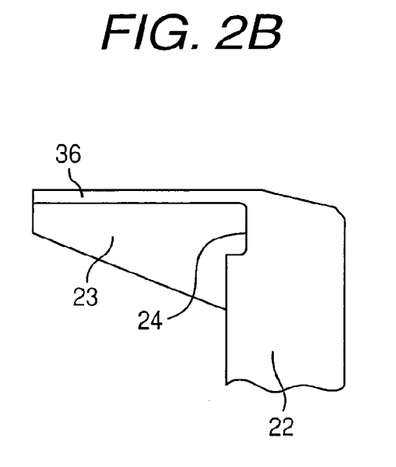
FIG. 2B is a fragmentary view showing a side view of the part of the claw-shaped pole shown in FIG. 2A.

FIGS. 2A and 2B are a fragmentary view mainly showing a shape of the claw-shaped pole 13 of one of the front and rear pole cores 14. As shown in FIGS. 2A and 2B, the claw-shaped pole 13 has a trapezoid shape in transverse cross section and includes a tapered profile that decreases in width towards a distal end thereof. In addition, the claw-shaped pole 13 has both circumferential sides formed with circumferential walls 23 from which flange portions 36 extend, respectively, in a circumferential direction of the rotor 2. Under a state where the pole cores 14 are assembled to the rotary shaft 10, the front and rear claw-shaped poles 13, placed adjacent each other in face-to-face relationship in the circumferential direction of rotor 2, have circumferentially spaced sidewalls 23 facing each other in the circumferential direction of rotor 2. Under such a state, as the field coil 12 is applied with field current, one of two adjacent claw-shaped poles 13 is magnetized to an N-pole and the other to an S-pole with magnetic flux exchange taking place in the circumferential direction of the rotor 2 in an area between the adjacent circumferential sidewalls 23 of the front and rear claw-shaped poles 13 facing each other in the circumferential direction of the rotor 2.

Figure 3:
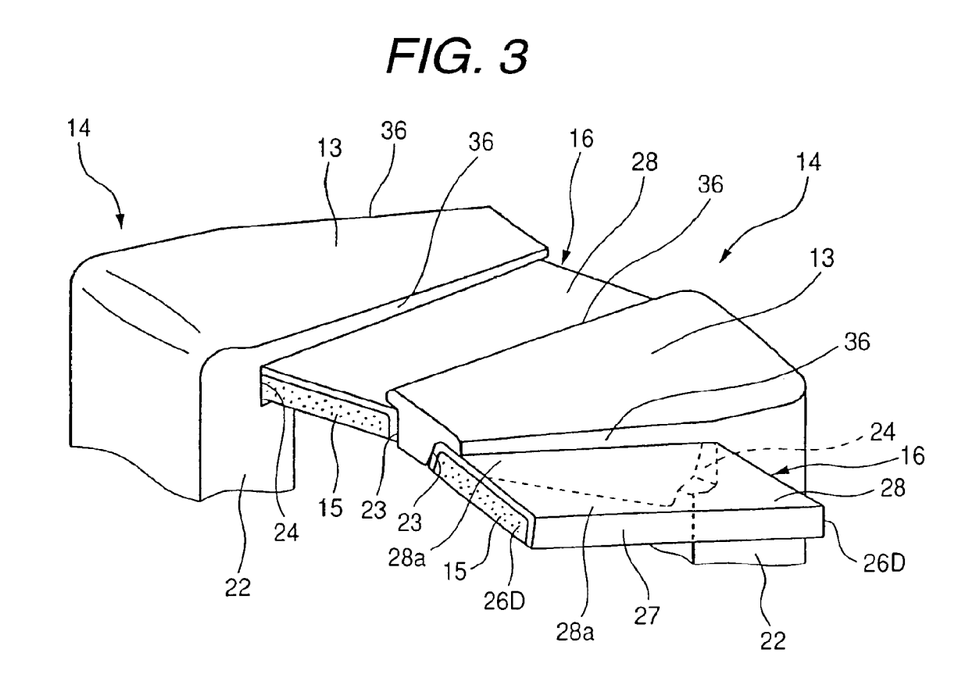
FIG. 3 is a fragmentary perspective view showing a part of the rotor with which permanent magnets and magnet holding members are supported in fixed paces under an assembled state.

FIG. 3 is a fragmentary perspective view of a part of the rotor 2 showing a concrete structure on which the permanent magnets 15 and the magnet holding members 16 are supported between the front and rear claw-shaped poles 13 facing each other in the circumferential direction of the rotor 2 in assembled states.

Each of the permanent magnets 15 includes a rare-earth magnet such as a Neodymium magnet formed in a substantially rectangular solid body and assembled to the rotor 2 such that its longitudinal axis is aligned in an axial direction of the rotor 2. Further, the permanent magnet 15 has two circumferential sidewalls one of which has a magnetic pole in N-pole and the other has a magnetic pole in S-pole.

In particular, the permanent magnet 15 is disposed between the two adjacent claw-shaped poles 13 of the rotor 2 such that its one sidewall with the S-pole faces the circumferential sidewall 23 of one claw-shaped pole 13 magnetized in the S-pole and the other sidewall with the N-pole faces the circumferential sidewall 23 of the other claw-shaped pole 13 magnetized in the N-pole. This results in a reduction in a leakage of magnetic fluxes occurring between one claw-shaped pole 13 in N-pole and the other claw-shaped pole 13 in S-pole, enabling the magnetic fluxes to exchange from the rotor 2 to the stator 3 in a maximal efficiency.

Figure 4:
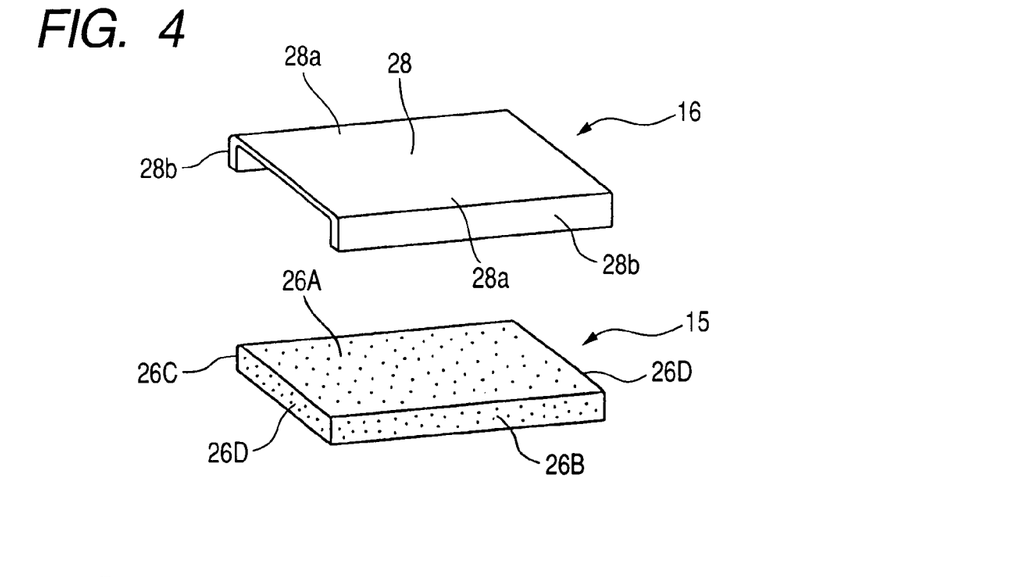
FIG. 4 is an exploded perspective view showing how the permanent magnets and the magnet holding members are assembled.

FIG. 4 is an exploded perspective view showing the permanent magnet 15 and the magnet holding member 16 under an assembled state. The magnet holding member 16 has a substantially C-shape in cross section so as to cover an outer top surface 26A and two circumferential sidewalls 26B, 26C of the permanent magnet 15.

In particular, the magnet holding member 16 includes a longitudinally extending top cover section 28, acting as a bridge section to cover the outer top wall 26A of the permanent magnet 15, which has marginal portions 28a and circumferential sidewalls 28b that axially and radially extend inward from the marginal portions 28a so as to cover the associated sidewalls 26B, 26C of the permanent magnet 15. The permanent magnet 15 also has axial end faces 26D in axial alignment with the end faces of the rotor 2.

Further, the magnet holding member 16 is made of non-magnetic material such as stainless steel and has the same axial length as that of the permanent magnet 15. As shown in FIG. 3, the magnet holding member 16 is assembled to the rotor 2 in an area between the two claw-shaped poles 13 such that the magnet holding member 16 surrounds the permanent magnet 15 in a substantially C-shaped configuration under which the top cover section 28 covers the outer circumferential side (outer top surface) of the permanent magnet 15 and sidewalls thereof.

More particularly, under an assembled state of the rotor 2 shown in FIG. 3, one marginal area 28a of the magnet holding member 16 is held in abutting contact with a radially inner periphery of the flange portion 36 of the claw-shaped pole 13 in a radially restricted state. In addition, the sidewall 28b of the magnet holding member 16 is held in abutting contact with the circumferential sidewall 23 of the claw-shaped pole 13 under a restricted state in a circumferential direction of the rotor 2.

Further, the disc portion 22 of each of the front and rear pole cores 14 has stepped portions 24 formed in axially concaved portions on both circumferential sidewalls 23 to be contiguous therewith and the flange portions 36 of the claw-shaped pole 13. Thus, an axial end face 26D of the permanent magnet 15 rests on the stepped portions 24 of the adjacent claw-shaped poles 13 to be restricted therewith in the axial direction of the rotor 2. Each of the stepped portions 24 has a radial dimension that is set to be larger than a radial thickness covering both the permanent magnet 15 and the magnet holding member 16.

With the permanent magnet 15 and the magnet holding member 16 sandwiched between the adjacent claw-shaped poles 13 of the front and rear poles 14, the permanent magnet 15 and the magnet holding member 16 are precisely positioned in fixed places under restricted states in a circumferential direction, a radial direction and an axial direction of the rotor 2 without the use of extra restricting component parts. This minimizes the number of component parts of the rotor 2 with the resultant reduction in the number of man-hours for assembling. Thus, the rotor 2 can be manufactured at low cost in high efficiency. In addition, with the rotor 2 having the permanent magnets 15 positioned in fixed places with highly increased precision, the vehicle alternator 1 can have increased reliability at low cost.

The magnet holding member 16 may be disposed between the permanent magnet 15 and the axially concaved stepped portion 24. This allows the rotor 2 to have improved reliability of holding the permanent magnet 15.

During assembly of the rotor 2, the magnet holding members 16 are mounted on the discrete permanent magnets 15 separately from each other, after which each of the respective magnet holding members 16 is fitted to between the claw-shaped poles 13 of each of the front and rear pole cores 14. This makes the assembling work of the rotor 2 to be cumbersome and complicated.

In order to address such cumbersome and complicated work, with the vehicle alternator 1 of the present embodiment, the rotor 2 further includes a circumferentially extending connecting member 19 made of highly flexible material such as nylon material. The connecting member 19 connects and retains the respective non-magnetized permanent magnets 15 and the respective magnet holding members 16 in a toric structure.

The respective non-magnetized permanent magnets 15 and the respective magnet holding members 16, retained with the connecting member 19, are assembled to the respective claw-shaped poles 13 of one of the front and rear pole cores 14, after which the other one of the front and rear pole cores 14 is axially assembled to one of the front and rear pole cores 14 such that the respective claw-shaped poles 13 of the other one of the front and rear pole cores 14 mate with the relevant non-magnetized permanent magnets 15 and the magnet holding members 16 of one of the front and rear pole cores 14. Thereafter, the connecting member 19 is removed from respective non-magnetized permanent magnets 15 and the respective magnet holding members 16 on a final stage of a production process.

Figure 5:
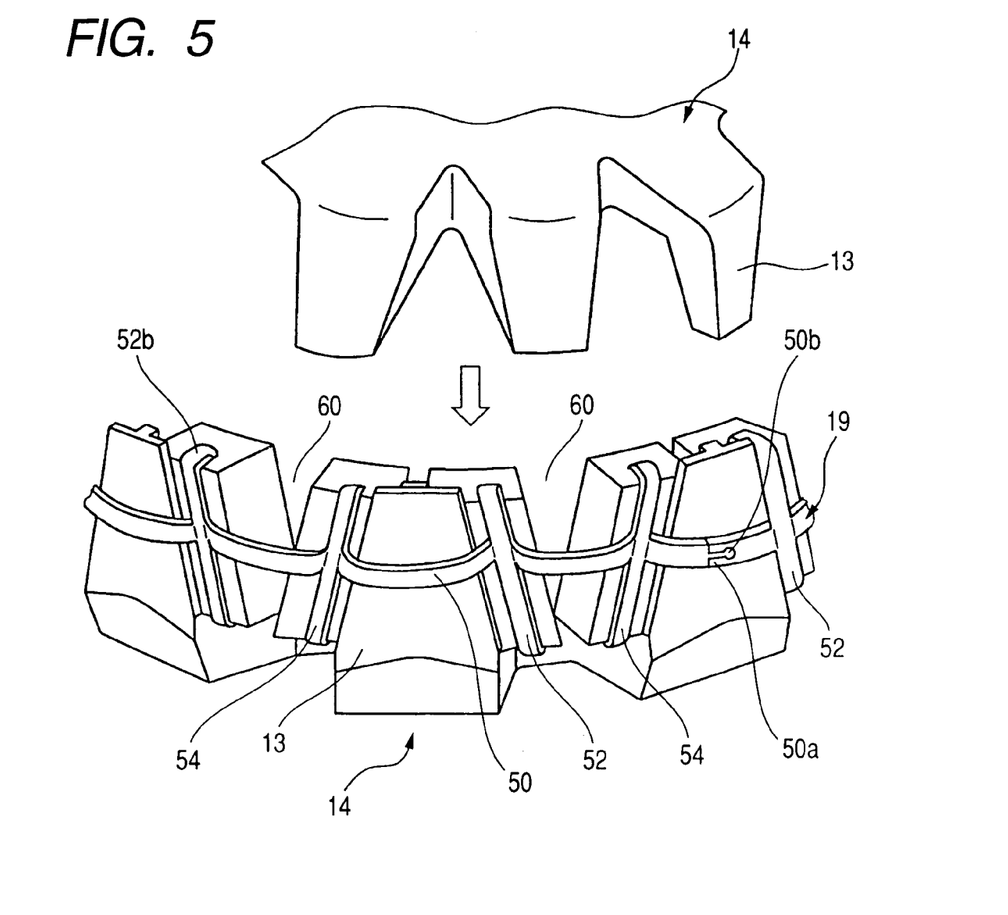
FIG. 5 is an exploded perspective view showing how a second pole core is assembled to a first pole core to which the permanent magnets and the magnet holding members are preassembled with the aid of a connecting member.

FIG. 5 is a fragmentary perspective view showing a state under which the respective non-magnetized permanent magnets 15 and the respective magnet holding members 16, connected to each other with the connecting member 19, are placed in engagement with the respective claw-shaped poles 13 of one of the front and rear pole cores 14.

Figure 6:
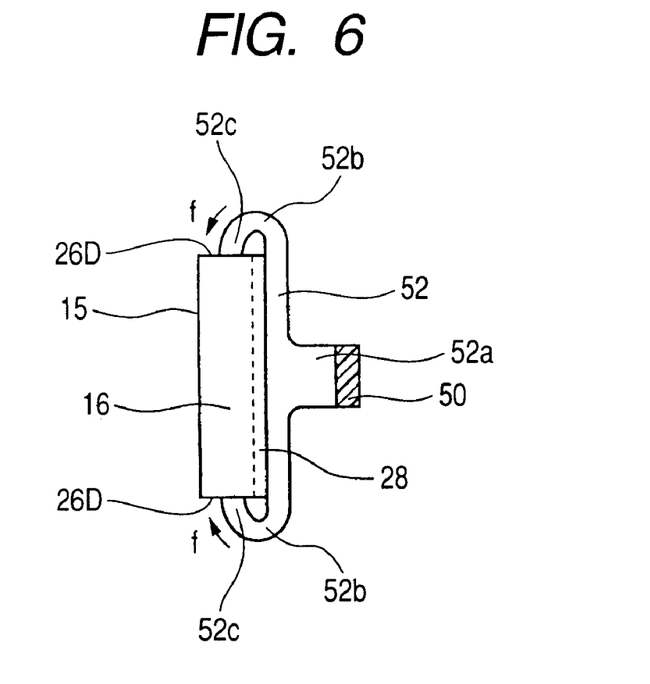
FIG. 6 is a cross sectional view showing a detailed structure of the connecting member shown in FIG. 5.
Figure 7:
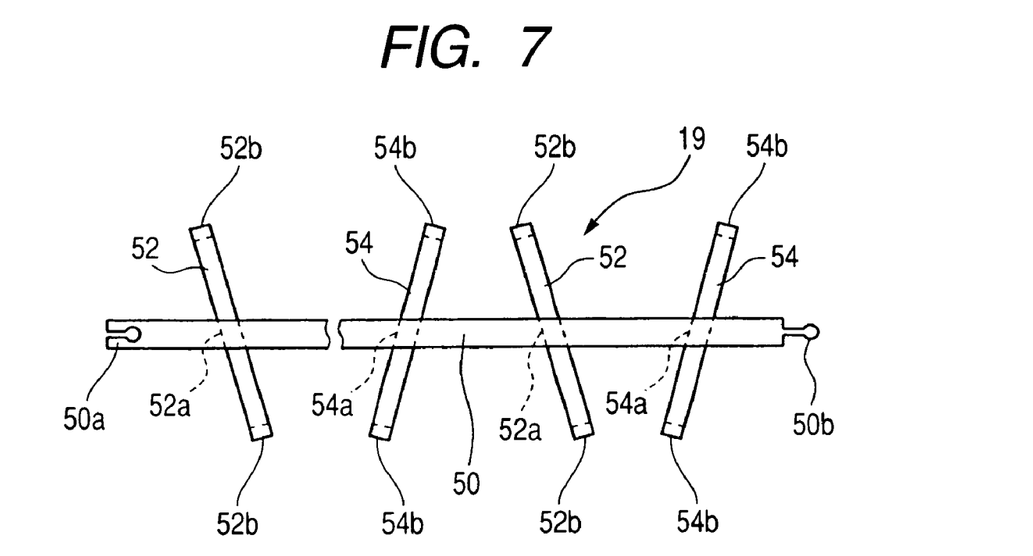
FIG. 7 is a development view of the connecting member deployed in a circumferential direction.

FIG. 6 is a view showing a fragmentary detailed structure of the connecting member 19 with its component elements associated with a pair of the permanent magnet 15 and the magnet holding member 16. FIG. 7 is a development view showing the magnet holding member 16 developed in the circumferential direction of the rotor 1.

As shown in FIG. 6, the connecting member 19 includes a circumferentially extending main connecting body 50 having one engaging end 50a and the other engaging end 50b that are engageable with each other to form a toric structure. The main connecting body 50 includes circumferentially and equidistantly spaced first and second slanted holder segments 52, 54.

Each of the slanted holder segments 52 vertically suspends from the main connecting body 50 via a suspending portion 52a and is inclined at a first given angle with respect to the main connecting body 50 in alignment with a skew angle of one sidewall 28b of the magnet holding member 16 with respect to a rotational axis of the rotor 2. Each of the first slanted holder segments 52 has both ends formed with U-shaped holder portions 52b, serving as retaining portions, which have terminal ends 52c placed in face-to-face relationship with each other. The terminal ends 52c are held in pressured abutting engagement with the axial end faces 26D of each permanent magnet 15 with appropriate engaging forces "f" to retain the permanent magnet 15 in fixed place.

Likewise, the second slanted holder segments 54 have the same structures as the first slanted holder segment 52 except in that each of the second slanted holder segments 54 is placed in alignment with a skew angle of the other sidewall 28b of the magnet holding member 16 with respect to the rotational axis of the rotor 2. Each of the second slanted holder segments 54 has both ends formed with U-shaped holder portions 54b, serving as retaining portions, which are held in pressured abutting engagement with the axial end faces 26D of each permanent magnet 15 with appropriate engaging forces "f" to retain the permanent magnet 15 in fixed place in the same manner as each of the first slanted holder segments 52.

With the connecting member 19 formed in such a structure, the respective permanent magnets 15 and the magnet holding members 16 are held and retained with the first and second slanted holder segments 52, 54, respectively, and the engaging end 50b is coupled to the engaging end 50a thereby forming a toric structure so as to form a plurality of circumferentially and equidistantly spaced clearances 60 as shown in FIG. 5.

The permanent magnets 15 and the magnet holding members 16 are assembled to one of the pole core 14, utilizing the toric structure 19 in a manner as shown in FIG. 5, so as to sandwich each claw-shaped pole 13 with each clearance 60 being defined between the adjacent the magnet holding members 16. Then, the other pole core 14 is assembled to the pole core 14 to which the permanent magnets 15 and the magnet holding members 16 have been already preassembled. On a final stage of assembly, the engaging end 50 is unclamped from the engaging end 50a, after which only the connecting member 19 is removed from the rotor 2.

Thus, under a status where the non-magnetized permanent magnets 15 and the magnet holding members 16 are restricted in a circumferential direction, a radial direction and an axial direction of the rotor 2, the rotor 2 is assembled and an outer diametric surface of the rotor 2 is cut and additional cutting work is performed for taking a rotating balance of the rotor 2. On a last stage, magnetizing step is conducted to magnetize the permanent magnets 15. This provides a capability of avoiding an issue of a drop in reliability resulting from step of assembling preliminarily magnetized permanent magnets.

Further, temporarily locating the non-magnetized permanent magnets 15 and the magnet holding members 16 on the stepped portions 24, formed on the disc portion 22, to be stationary in fixed place enables the non-magnetized permanent magnets 15 and the magnet holding members 16 to be restricted in the circumferential direction, the radial direction and the axial direction of the rotor 2. This provides no need for another member to be prepared for interconnecting and restricting these component parts in a toric structure. This prevents increases in the number of component parts and the number of man-hours, while making it possible to achieve a reduction in production cost due to the use of the magnetic holding members 16 formed in simple structures.

In addition, the stepped portions 24 can be formed on the disc portion 22 to be contiguous with the circumferential sidewalls 23 and the flange portions 36 for restricting the non-magnetized permanent magnets 15 and the magnet holding members 16 in the axial direction of the rotor 2. Therefore, when fabricating the pole core 14 by forging, the stepped portions 24 can be formed on a forging step not without forming the same on discrete cutting steps, thereby suppressing an increase in production cost.

Moreover, the connecting member 19, with which the non-magnetized permanent magnets 15 and the magnet holding members 16 are interconnected in the toric structure, is not left on the rotor 2 and can be reused in assembly on a next stage. This enables a reduction in material cost. In addition, this enables the non-magnetized permanent magnets 15 and the magnet holding members 16 to be assembled to the claw-shaped poles 13 in a simplified step. Thus, the rotor 2 can be fabricated at lower cost that that achieved in the related art rotor in which permanent magnets are located each between adjacent polar claws.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof. For instance, while the present embodiment has been described with reference to the rotor of the vehicle alternator including the Lundell-type pole cores in a single pair, the present invention is not limited to such a structure of the vehicle alternator. The present invention may also be applied to a vehicular electric rotary machine of another type such as a tandem type alternator including front and rear Lundell-type rotor cores including a plurality of field coils.

What is claimed is:

1. A rotor for a vehicular electric rotary machine, comprising:
    a rotary shaft;
    front and rear pole cores with cylindrical boss portions carried on the rotary shaft adjacent to each other, front and rear disc portions radially extending from axial ends of the boss portions, respectively, a field coil carried by the boss portions, and front and rear claw-shaped pole portions axially extending from outer peripheries of the front and rear disc portions in axially opposite directions so as to mate with each other;
    a plurality of permanent magnets each disposed between circumferentially adjacent claw-shaped poles; and
    a plurality of magnet holding members, each made of metallic material, each of which covers an outer top surface of each permanent magnet and circumferential sidewalls of each of the permanent magnets, respectively;
    wherein each of the front and rear disc portions includes axially extending stepped portions to retain axial end faces of each permanent magnet and each magnet holding member in axially and radially fixed relationship;
    wherein each of the stepped portions includes an opposed portion facing axial ends and radially inward ends of each of the permanent magnets and each of the magnet holding members; and
    wherein each of the permanent magnets is held in a position radially spaced from an outer circumferential periphery of the field coil.

2. The rotor for the vehicular electric rotary machine according to claim 1, wherein:
    each of the claw-shaped pole portions has axially and circumferentially extended flange portions extending from the opposed portion of each of the stepped portions to fixedly retain each of the permanent magnets on the rotor.

3. The rotor for the vehicular electric rotary machine according to claim 2, wherein;
    the stepped portions are formed on each of the disc portions to be contiguous with both circumferential sidewalls and the flange portions of each of the claw-shaped poles.

4. A vehicular electric rotary machine, comprising:
    a housing carrying thereon a stator;
    a rotary shaft rotatably supported with the housing;
    a rotor including front and rear pole cores, carried on the rotary shaft adjacent to each other to be rotatable inside the stator, which include boss portions supported on the rotary shaft and carrying thereon a field coil, front and rear disc portions radially extending from the boss portions, respectively, front claw-shaped pole portions axially extending from the front boss portion so as to surround the field coil in equidistantly spaced positions and each having a pair of circumferentially and axially extending flange portions, and rear claw-shaped pole portions, each of the claw-shaped pole portions having a pair of circumferentially and axially extending flange portions, which axially extend from the second boss portion so as to surround the field coil in equidistantly spaced positions circumferentially spaced from the front claw-shaped pole portions, respectively, to provide a plurality of circumferentially spaced clearances each between each of the front claw-shaped pole portions and each of the rear claw-shaped pole portions;

a plurality of permanent magnets each disposed in the plurality of circumferentially spaced clearances, respectively; and a plurality of magnet holding members covering the plurality of permanent magnets, respectively;

wherein each of the front and rear disc portions includes axially extending stepped portions to retain axial end faces of each of the permanent magnets and each of the magnet holding members in axially and radially fixed positions;

wherein each of the stepped portions includes an opposed portion facing axial ends and radially inward ends of each of the permanent magnets and each of the magnet holding members; and wherein each of the permanent magnets is held in a position radially spaced from an outer circumferential periphery of the field coil.

5. The vehicular electric rotary machine according to claim 4, wherein:

the flange portions extend from the opposed portion of each of the stepped portions to fixedly retain each of the permanent magnets on the rotor.

6. The vehicular electric rotary machine according to claim 4, wherein:

the stepped portions are formed on each of the front and rear disc portions to be contiguous with both circumferential sidewalls and the flange portions of each of the claw-shaped poles.

7. A vehicular electric rotary machine, comprising:

a housing carrying thereon a stator;

a rotary shaft rotatably supported with the housing;

a rotor including front and rear pole cores, carried on the rotary shaft adjacent to each other to be rotatable inside the stator, which include boss portions supported on the rotary shaft and carrying thereon a field coil, front and rear disc portions radially extending from the boss portions, respectively, front claw-shaped pole portions axially extending from one axial end of the front boss portion so as to surround the field coil in equidistantly spaced positions and each of the claw-shaped pole portions having a pair of circumferentially and axially extending flange portions, and rear claw-shaped pole portions, each having a pair of circumferentially and axially extending flange portions, which axially extend from one axial end of the second boss portion so as to surround the field coil in equidistantly spaced positions circumferentially spaced from the front claw-shaped pole portions, respectively, to provide a plurality of circumferentially spaced clearances each between each of the front claw-shaped pole portions and each of the rear claw-shaped pole portions, the front and rear disc portions having pluralities of axially facing stepped portions to be contiguous with the flange portions, respectively;

a plurality of permanent magnets each disposed in the plurality of circumferentially spaced clearances, respectively; and a plurality of magnet holding members covering the plurality of permanent magnets, respectively;

wherein each of the permanent magnets and each of the magnet holding members are held in abutting engagement with the stepped portions of each of the front and rear disc portions to be restricted in axially and radially fixed positions;

wherein each of the stepped portions includes an opposed portion facing axial ends and radially inward ends of each of the permanent magnets and each of the magnet holding members; and wherein each of the permanent magnets is held in a position radially spaced from an outer circumferential periphery of the field coil.

8. The vehicular electric rotary machine according to claim 7, wherein:

the flange portions extend from the opposed portion of each of the stepped portions to fixedly retain each of the permanent magnets on the rotor.

* * * * *